United States Patent
Ishiwaka et al.

[11] Patent Number: 5,621,457
[45] Date of Patent: Apr. 15, 1997

[54] SIGHTING DIRECTION DETECTING DEVICE FOR VEHICLE

[75] Inventors: Takuo Ishiwaka, Zushi; Hirosi Saitou, Yokohama, both of Japan

[73] Assignee: Nissan Motor Co., Ltd., Kanagawa-ken, Japan

[21] Appl. No.: 524,950

[22] Filed: Sep. 8, 1995

[30]     Foreign Application Priority Data

Sep. 26, 1994   [JP]   Japan .................................. 6-229626

[51] Int. Cl.$^6$ .................................................. H04N 7/18
[52] U.S. Cl. ........................... 348/78; 348/164; 348/169
[58] Field of Search ........................... 348/78, 164, 169, 348/115, 116; H04N 7/18

[56]                     References Cited

U.S. PATENT DOCUMENTS

| | | | |
|---|---|---|---|
| 3,533,683 | 10/1970 | Stark | 348/164 |
| 4,075,657 | 2/1978 | Weinblatt | 348/78 |
| 4,648,052 | 3/1987 | Friedman | 348/78 |
| 4,748,502 | 5/1988 | Friedman | 348/169 |

FOREIGN PATENT DOCUMENTS

| | | |
|---|---|---|
| 2-134130 | 5/1990 | Japan . |
| 6-261863 | 9/1994 | Japan . |

*Primary Examiner*—Howard W. Britton
*Attorney, Agent, or Firm*—Lowe, Price, LeBlanc & Becker

[57]                     ABSTRACT

A sighting direction detecting device including a TV camera which is disposed to face a human being and picks up an image of light invisible to human beings, a first illuminator which is disposed in a coaxial system with the TV camera and illuminates a human's eye-ball portion with light which is invisible to human beings, a second illuminator which is disposed at a different place from the first illuminator and illuminates the human's eye-ball portion with light which is invisible to human beings, a first calculator for calculating an equation of a line passing the pupil center position of the eye-ball, an equation of a line passing the reflected-light position of the first illuminator and an equation of a line passing the reflected-light position of the second illuminator on the basis of the image which is picked up by the camera, a second calculator for calculating the center position of a cornea ball on the basis of the equation of the line passing the reflected-light position of the first illuminator and the equation of the line passing the reflected-light position of the second illuminator which are calculated by the first calculator, and a third calculator for calculating the sighting direction of the human being on the basis of the equation of the line passing the pupil center position detected by the first calculator and the center position of the cornea ball which is calculated by the second calculator, wherein the image obtained by the TV camera comprises a first image obtained under illumination of the first illuminator and the second illuminator and a second image obtained under illumination of illumination means which does not contain the first illuminator.

6 Claims, 15 Drawing Sheets

(ENLARGED VIEW OF ITEM DISPLAY OF SIGHTING SWITCH AREA 6)

(ENLARGED VIEW OF STEERING SWITCH 4)

SIGHTING DIRECTION DETECTING DEVICE FOR VEHICLE

BACKGROUND OF THE INVENTION

1. Field of the Invention

The present invention relates to a device for detecting a sighting direction of a driver in a vehicle from a remote place in a non-contact state.

2. Description of Related Art

It has been recently expected that such a driver's sighting direction detecting device is used as a non-contact human/machine interface for a vehicle in various fields, for example, to display visual information in a direction to which a driver turns his or her eyes, to operate a specific switch in accordance with a driver's sighting direction (direction of a driver's sight line), etc.

In order to achieve such a non-contact human/machine interface, a device in which a cornea reflected image of a driver is input and the driver's sighting direction is detected on the basis of position information of the cornea reflected image, has been hitherto proposed as a driver's sighting direction detecting device as described above. Here, the cornea reflected image is obtained when light irradiated to an eye-ball is reflected and refracted from each surface of an optical system constituting the eye-ball, and it is also called as "Purkinje's image".

As disclosed in Japanese Laid-open Patent application No. Hei-2-134130, this type of conventional sighting direction detecting device needs the following work: an cornea reflected image of a human being is picked up with a camera constituting a coaxial system with a light source, and the coordinate of reflected light of the light source is linked to the coordinate of the camera to obtain an equation for a line passing the center of a cornea ball and at the same time calculate the coordinate of the center of a pupil. In this conventional device, the above work is practically performed using two cameras which are disposed away from each other, and the driver's sighting direction is detected on the basis of the above coordinate information of the center of the cornea ball and the center of the pupil. That is, an intersection point between two lines each of which is obtained using each camera according to the above work is set as the center of the cornea ball, and a line which connects the coordinate of the center of the cornea ball and the coordinate of the center of the pupil is detected as a line of sight (sighting direction).

As described above, the conventional sighting directing detecting device as described above needs two cameras to detect the sighting direction, and thus its price is high.

In order to overcome this problem, the applicant of this application previously filed an application (Japanese Patent Application No. Hei-5-50619) on a line-of-sight measuring device having only one camera, so that the device can be designed at a low price. In this device, two illuminators which are disposed away from each other are alternately turned on at an extremely short time interval, and a pair of images (image pair) are picked up with the camera under illumination of the respective illuminators. On the basis of the image pair thus obtained, the coordinate value of a retina reflected image and the coordinate value of a cornea reflected image are calculated. A differential processing of the image pair thus obtained is performed for the calculation of the coordinate values of the retina reflected image and the cornea reflected image.

However, the device of the Japanese Patent Application No. Hei-5-50619 has the following problem. That is, when the differential processing is carried out with a TV camera using an ordinary NTSC signal, great positional deviation (displacement) may occur between the pair of images within a time interval between the times at which the respective images are taken into the device (picked up by the TV camera), due to vibration of a running vehicle, vibration of a driver which is caused by the vibration of the running vehicle or the like. In such cases, the positional deviation occurs in the coordinate value of the cornea reflected image, resulting in induction of a detection error. Therefore, this device has a disadvantage that the measurement (detection) of the sighting direction cannot be accurately performed.

SUMMARY OF THE INVENTION

An object of the present invention is to provide a sighting direction detecting device which is capable of accurately detecting a driver's sighting direction even in a vibrating vehicle using an ordinary relatively-low price TV camera using an NTSC system.

According to a first aspect of the present invention, a sighting direction detecting device includes a TV camera which is disposed to face a human being and picks up an image of light invisible to human beings, first illuminating means which is disposed in a coaxial system with the TV camera and illuminates a human's eye-ball portion with light which is invisible to human, second illuminating means which is disposed at a different place from the first illuminating means and illuminates the human's eye-ball portion with light which is invisible to human beings, first calculating means for calculating an equation of a line passing the pupil center position of the eye-ball, an equation of a line passing the reflected-light position of the first illuminating means and an equation of a line passing the reflected-light position of the second illuminating means on the basis of the image which is picked up by the camera, second calculating means for calculating the center position of a cornea ball on the basis of the equation of the line passing the reflected-light position of the first illuminating means and the equation of the line passing the reflected-light position of the second illuminating means which are calculated by the first calculating means, and third calculating means for calculating the sighting direction of the human being on the basis of the equation of the line passing the pupil center position detected by the first calculating means and the center position of the cornea ball which is calculated by the second calculating means, wherein the image obtained by the TV camera comprises a first image obtained under illumination of the first illuminating means and the second illuminating means and a second image obtained under illumination of illuminating means which does not contain the first illuminating means.

According to a second aspect of the present invention, in the sighting direction detecting device as described above, there is further provided at least one third illuminating means which is disposed at a different place from the first illuminating means, and illuminate the human's eye-ball with light which is invisible to human beings, wherein the image obtained by the TV camera comprises a first image obtained under illumination of the first illuminating means and the second illuminating means, and a second image obtained under illumination of at least the third illuminating means of the second illuminating means and the third illuminating means (the first illuminating means is turned out).

According to a third aspect of the present invention, in the sighting direction detecting device as described above, there is further provided at least one third illuminating means which is disposed at a different place from the first illuminating means and illuminates the human's eye-ball portion with light which is invisible to human beings, wherein the image obtained by the TV camera comprises a first image obtained under illumination of the first illuminating means, the second illuminating means and the third illuminating means, and a second image obtained under illumination of at least the third illuminating means of the second illuminating means and the third illuminating means (the first illuminating means is turned out).

According to the present invention, the first image is obtained under illumination of the first and second illuminating means (while the first and second illuminating means are turned on), and the second image is obtained under illumination of the illuminating means which does not contain the first illuminating means. The calculation of the human's sighting direction is performed by obtaining a cornea reflected-image position under illumination of the first illuminating means and a cornea reflected-image position under illumination of the second illuminating means. Even when the coordinate value of a retina reflected image and the coordinate value of a cornea reflected image are calculated, the first image contains the retina reflected-image position, the cornea reflected-image position under illumination of the first illuminating means and the cornea reflected-image position under illumination of the second illuminating means at the same time, so that there occurs no positional deviation which would be caused by a time image of an image take-in operation for respective two images. Therefore, the human's sighting direction can be accurately detected under a vibrational condition.

Furthermore, at least one third illuminating means is separately provided at a different place from the first illuminating means, and the same effect as described above is also obtained by obtaining the first image under illumination of both the first and second illuminating means while the second image is obtained under illumination of at least one illuminating means which does not contain the first illuminating means.

DETAILED DESCRIPTION OF THE PREFERRED EMBODIMENTS

Preferred embodiments according to the present invention will be described hereunder with reference to the accompanying drawings.

First, the construction of a first embodiment of the present invention will be described with reference to FIGS. 1 and 2.

Figure 1:
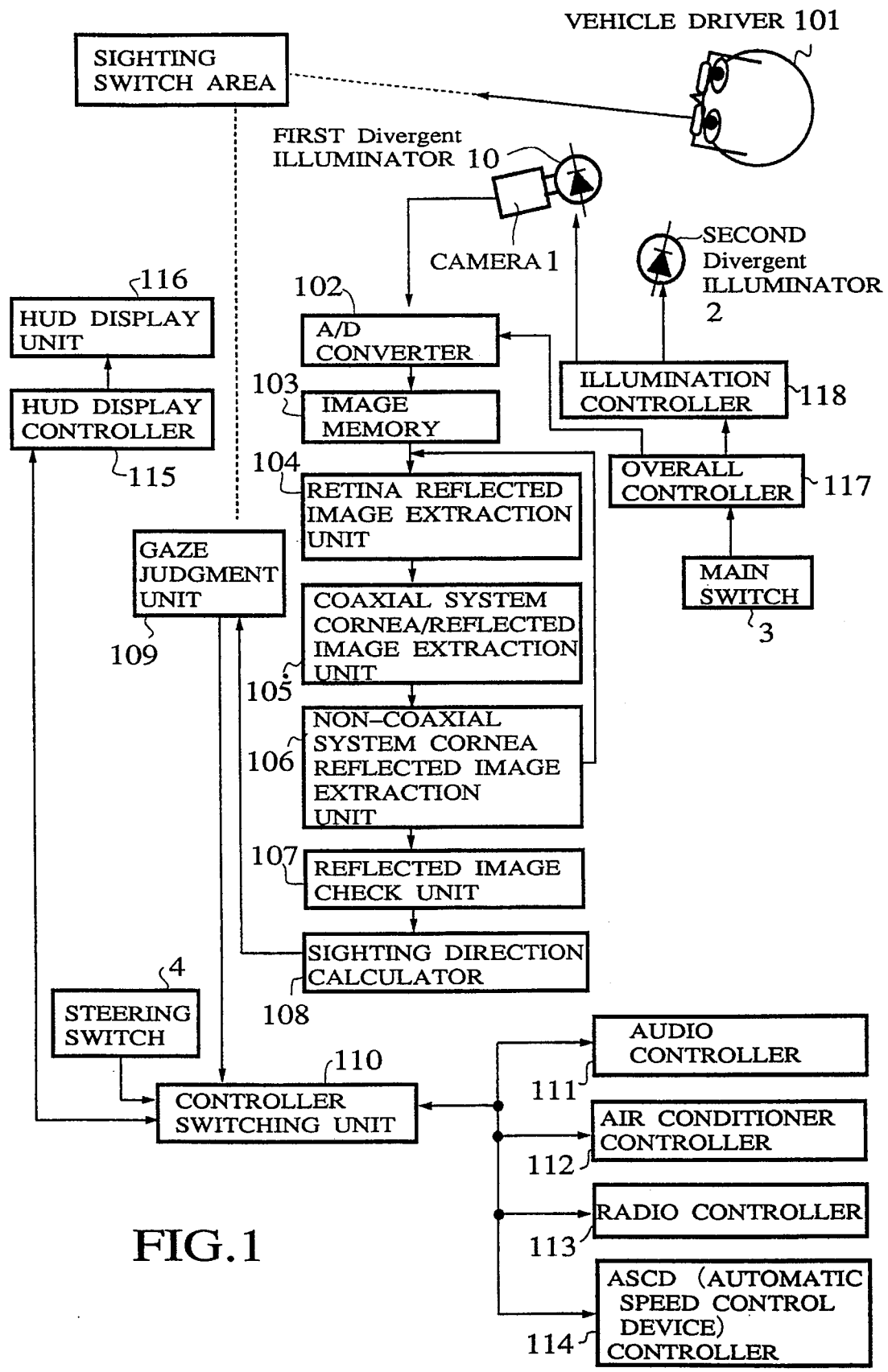
FIG. 1 is a block diagram showing the construction of a first embodiment according to the present invention.
Figure 2A:
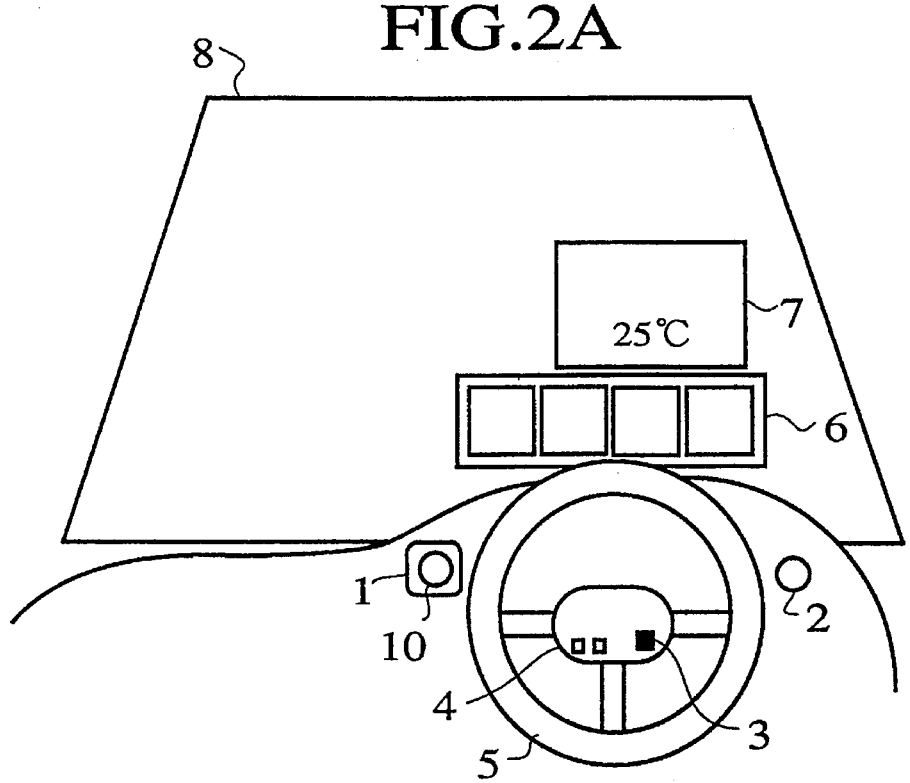
FIG. 2A is a diagram showing an equipment arrangement of a vehicle driver's seat portion of the first embodiment.
Figure 2B:
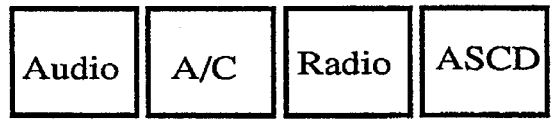
FIG. 2B is an expanded diagram showing a sighting switch area.
Figure 2C:
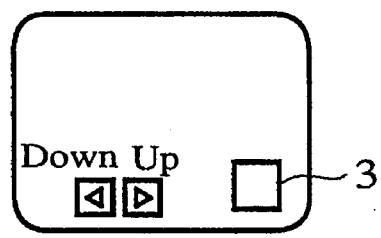
FIG. 2C is an expanded diagram showing a steering switch.

FIG. 1 is a block diagram showing the construction of a driver's sighting direction detecting device of a first embodiment of the present invention, and FIG. 2 is a diagram showing an equipment arrangement of a driver's seat portion in a vehicle.

As shown in FIG. 2A, a CCD camera 1 is disposed at the left side of a steering 5 on which a main switch 3 and a steering switch 4 are disposed. The CCD camera 1 is provided with a near infrared-ray source (first divergent illuminator) 10 disposed so that it constitutes a coaxial system with the CCD camera 1. The CCD camera 1 and the near infrared-ray source (first divergent illuminator) 10 constitutes a sensor unit. Furthermore, a near infrared-ray source (second divergent illuminator) 2 is disposed at the right side of the steering 5. The light emitted from each of the first and second illuminators is invisible to human beings. A sighting switch area 6 and an HUD (head-up display) display area 7 are displayed on a windshield of a vehicle.

As shown in FIG. 1, the eye-ball portion of a vehicle driver 101 is imaged by the camera 1 to obtain video signals of NTSC system. The video signals which are output from the camera 1 are input to an A/D converter 102 to be converted to digital data, and then stored in an image memory 108 for storing image data.

The following processing is carried out in a microcomputer which constitutes the device. First, a retina reflected-image position is extracted from input image data in a retina reflected-image extraction unit 104. In a coaxial system cornea reflected-image extraction unit 105 the position of a coaxial-system cornea reflected image is specified on the basis of the extracted retina reflected-image position. In a non-axial system cornea reflected-image extraction unit 106, the position of a non-axial system cornea reflected image is specified on the basis of the specified coaxial system cornea reflected image. In a reflected image check unit 107, the position of the reflected image is checked, and the sighting direction of the driver is calculated on the basis of the position of the retina reflected image and the position of the cornea reflected image in a sighting direction calculation unit 108 after the check operation is carried out by the reflected image check unit 107. The calculation result is supplied to a gaze judgment unit 109.

On the basis of the input calculation result, the gaze judgment unit 109 identifies a driver's gazing (attention-paid) position in a sighting switch area on the front windshield 8 to which the driver pays his attention, and outputs control information to a controller switching unit 110.

On the basis of the gazing position which is obtained in the gaze judgment unit 109, the controller switching unit 110 outputs a signal to control any one of an audio controller 111, an air conditioner controller 112, a radio controller 113 and an ASCD (automatic speed control device) controller 114.

The HUD display controller 115 makes a corresponding display on the HUD display unit 116 on the basis of the signal of each controller (111, 112, 113, 114) which is output through the controller switching unit 110.

The signal of the steering switch 4 is supplied through the controller switching unit 110 to each controller (111, 112, 113, 114). Furthermore, the signal of the main switch 3 is supplied to an overall controller 117, and a control signal which is generated in the overall controller 117 is supplied to an illumination controller 118 for controlling the first and second divergent illuminators 10 and 2, and also supplied to the A/D converter 102.

Next, the operation of the first embodiment will be described representatively using a case where a set temperature of an air conditioner is altered.

When a vehicle driver wants to operate an air conditioner, the driver gazes at an area for the air conditioner (an area "A/C" shown in FIG. 2B) in the sighting switch area 6 on the windshield 8, and at the same time the vehicle driver pushes the main switch of the steering 5. With this operation, the sighting direction detecting device shown in FIG. 1 starts its operation, and the detection of the driver's sighting direction is performed according to the following processing.

Figure 3:
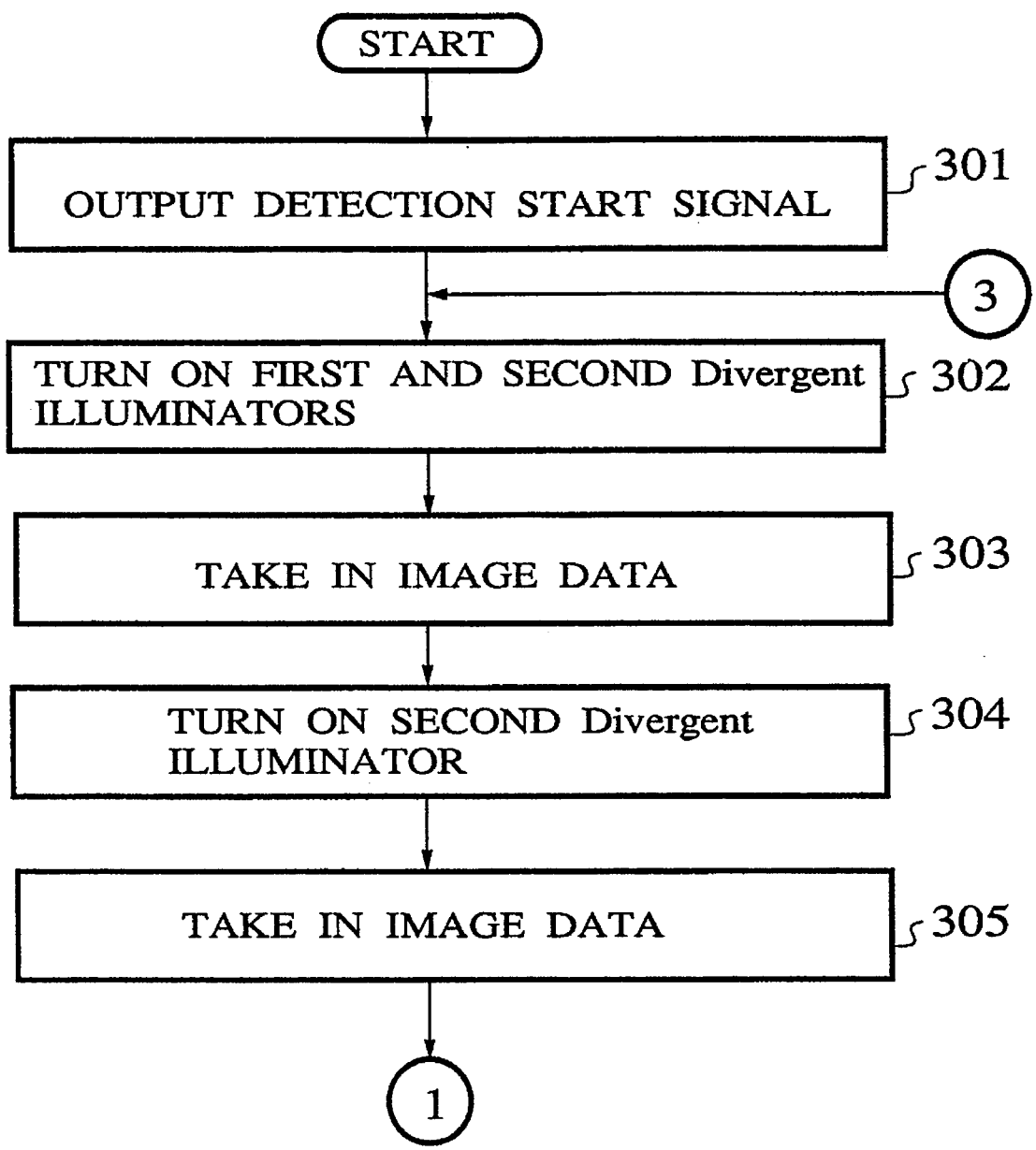
FIG. 3 is a flowchart of a sighting direction detecting (measuring) process in the first embodiment.
Figure 4:
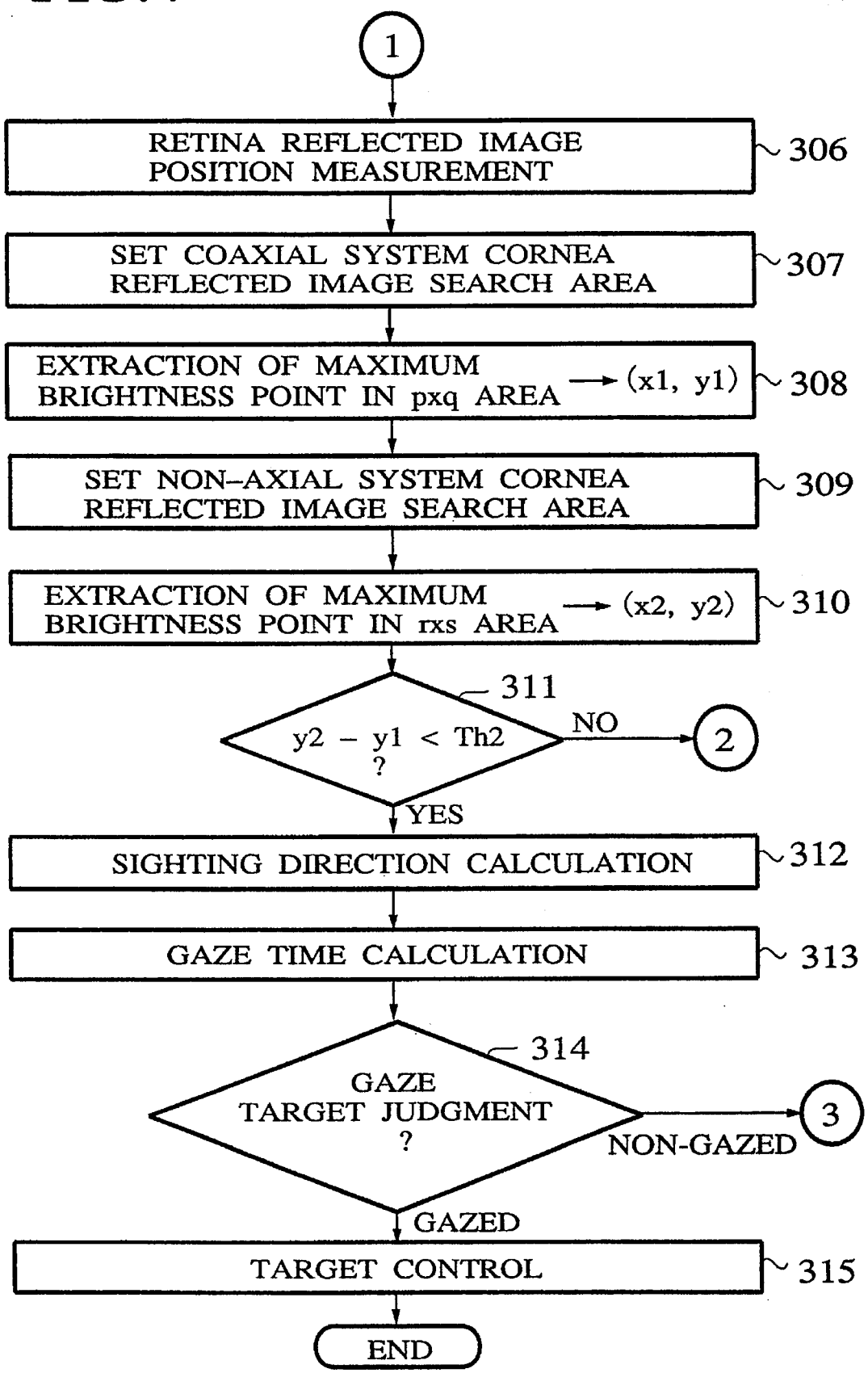
FIG. 4 is another flowchart of the sighting direction detecting (measuring) process in the first embodiment.

That is, referring to the flowcharts of FIGS. 3 and 4, a control start signal is first output from the overall controller 117 (step 301), and a trigger signal is output from the illumination controller 118 on the basis of the control start signal, whereby both the first divergent illuminator 10 and the second divergent illuminator 2 are turned on to illuminate the face of the driver 101 with light (step 302).

Subsequently, the image of an illuminated face area is picked up by the camera 1 (this process is hereinafter referred to as "image data input operation"), and then its image information is subjected to A/D conversion in the A/D converter 102. The digital image information thus obtained is then stored as digital image data I1(x,y) in an image memory 103 (step 303).

Subsequently, the second divergent illuminator 2 is turned on in accordance with the trigger signal from the illumination controller 118 to illuminate the face of the driver 101 (step 304). The image of the illuminated face area is picked up by the camera 1 (i.e., the image data input operation is carried out) again, and its image information is subjected to A/D conversion in the A/D converter 102 in the same manner as described above. The digitalized image information is then stored as digital image data I2(x,y) in the image memory 103 (step 305).

As described above, according to this embodiment, both the first and second divergent illuminators 10 and 2 are turned on when a first image data input operation is carried out, and only the second divergent illuminator 2 is turned on when a second image data input operation is carried out.

Thereafter, the gravity center position of the retina reflected image of the driver 101 is calculated on the basis of the image data I1(x,y) and I2(x,y) by the retina reflected-image extraction unit 104 as shown in FIG. 4 (step 306). In this case, the reflected light from the retina of the driver 101 may go back using the combination of the camera 1 and the first divergent illuminator 10 which are arranged as the coaxial system.

Figure 5:
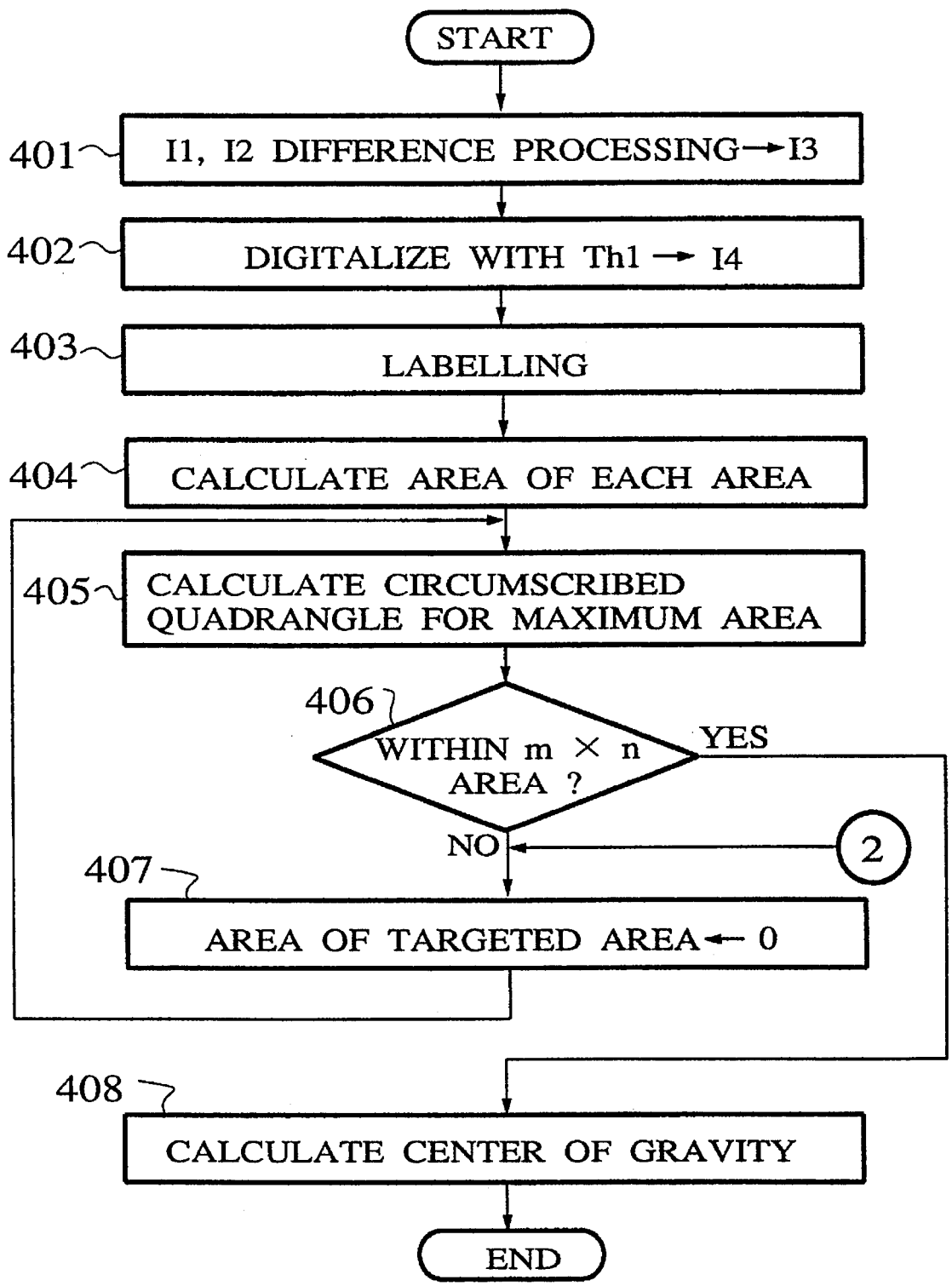
FIG. 5 is a flowchart to calculate the position of center of gravity of brightness in a retina reflected image in step 307.

The extraction of a candidate of the gravity center position of the retina reflected image is performed according to the processing which is shown by the flowchart of FIG. 5.

First, the difference between the image data I1(x,y) and the image data I2(x,y) is calculated to obtain image data I3(x,y) (step 401). In this case, when the image data obtained by the difference processing is equal to a negative value, these image data are set to zero. The image data I1(x,y) are subsequently kept to be stored because these data will be used for subsequent processing.

Subsequently, the image data I3(x,y) are digitalized to binary values using a predetermined fixed threshold value Th1 (Th1>0) to obtain image data I4(x,y) from which noise components are removed (step 402).

Thereafter, a labelling process of numbering the image data I4(x,y) of each extracted area is carried out (step 403) to number each extracted area. This process has been generally used for the image processing, and thus the detailed description on this processing is omitted from the following description.

Subsequently, the area of each area after the labelling process is calculated (step 404). In this process, a table in which the area is stored in correspondence with each area is prepared in the memory. Thereafter, a circumscribed quadrangle is obtained for the area having the maximum area, and the length of each of the longitudinal and lateral sides of the quadrangle is calculated (step 405).

Subsequently, it is judged whether the circumscribed quadrangle is surely located within an area of mxn (step 406). This means that the following inequalities are satisfied at the same time:

(length of lateral side)<m (length of longitudinal side)<n

If the circumscribed quadrangle is located within the mxn area, the process goes to step 408. On the other hand, if the circumscribed quadrangle (target area) is larger than the mxn area, the process goes to step 407.

If the target area is judged to be out of the mxn area (step 406: No), the area of the target area is set to zero (step 407). Thereafter, the comparison operation is carried out for an area having a large area again (step 405).

At this time, if the driver puts on glasses and reflection occurs from glass frames, the reflected image is not circular, but linear, curved or elliptical in shape. On the other hand, the retina reflected image is generally circular in shape. The diameter of the pupil is equal to 10 mm at maximum, and thus the reflected image from the glass frames can be removed by comparing the reflected image with an area of (lateral) m×(longitudinal) n which is preset so as to surely cover the retina reflected image. This calculation is carried out through the steps 405 to 407. That is, of the labelled areas, an area which has the maximum area and is located within the mxn area is selected as a candidate for the retina reflected image.

Subsequently, the gravity center position of the retina reflected image is calculated (step 408). The operation from the step 401 to step 408 corresponds to the content of the step 306, and constitutes the retina reflected image extracting means.

Subsequently, if the gravity center position of the retina reflected image can be specified, the position of the coaxial system cornea reflected image can be also specified on the basis of the above calculated gravity center position of the retina reflected image.

Figure 6:
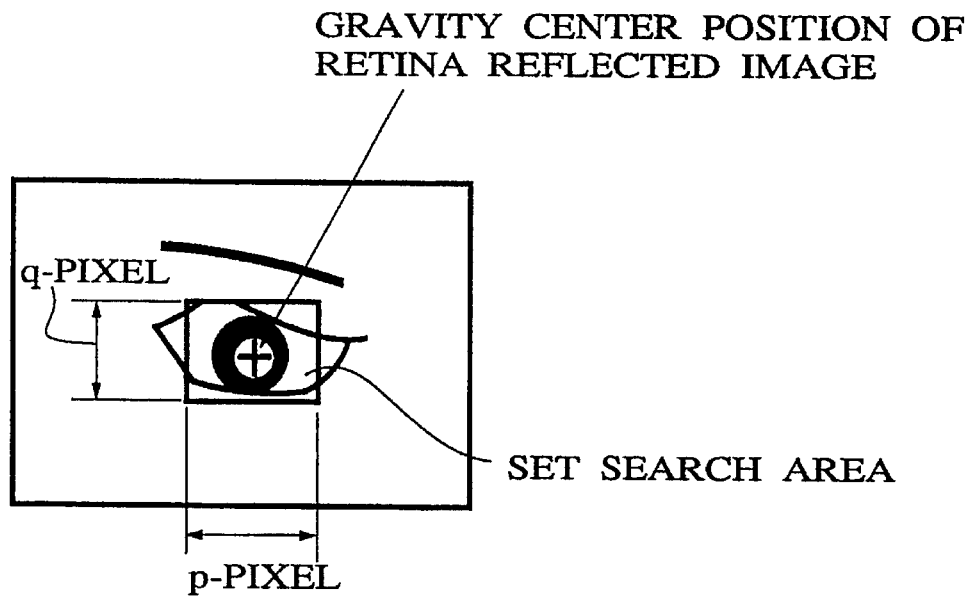
FIG. 6 is a diagram showing an example of a p×q area.

That is, an area to search the brightness position is first set in the neighborhood of the candidate of the gravity center position of the retina reflected image (step 307). The search area is assumed to be set at the center of the gravity center position of the retina reflected image. In this case, a pxq area is set as the search area as shown in FIG. 6. The coefficients p and q are preset.

Next, the maximum brightness point is searched in the pxq area (step 308), and the coordinate at the maximum brightness point is set as (x1,y1). The steps 307 and 308 constitute the coaxial system cornea reflected image extracting means.

Figure 7:
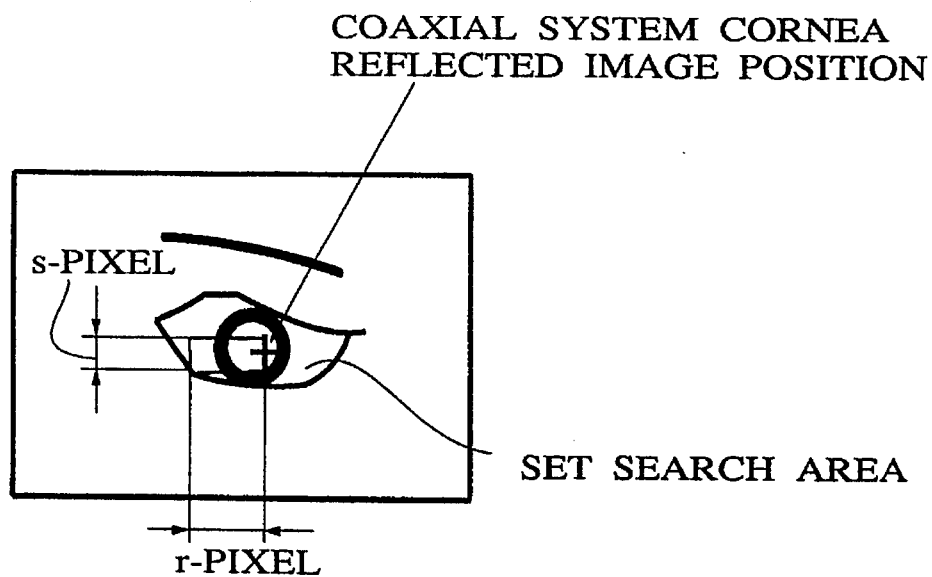
FIG. 7 is a diagram showing an example of an r×s area.

Subsequently, an rxs area is set to search an area in the neighborhood of the coordinate (x1,y1) of the maximum brightness point which is extracted from the image data I1(x,y) in step 308 (step 309). The rxs area is set as shown in FIG. 7 in consideration of the fact that the corresponding reflected image is parallel to a line connecting the divergent illuminators 10 and 2, and the reflected image under illumination of the divergent illuminator 2 is surely located at the left side of the reflected image under illumination of the divergent illuminator 10.

Subsequently, the maximum brightness point within the rxs area is searched (step 310), and the coordinate of this point is set as (x2,y2). The steps S309 and 310 constitute the non-coaxial system cornea reflected image extracting means.

The non-coaxial system cornea reflected image is searched from I1(x,y) in the process as described above, and the reason for this is as follows. If there is no vibration within a time interval between the image I1(x,y) and the image I2(x,y), no positional deviation would occur between both the images. Therefore, the reflected image position under illumination of the second divergent illuminator 2 is coincident between the images I1(x,y) and I2(x,y). Accordingly, if the difference image data I3(x,y) is used to search the non-axial system cornea reflected image, in some cases the non-coaxial system cornea reflected image cannot be extracted.

In addition to the reflected image under illumination of the second divergent illuminator 2, the image I1(x,y) may partially contain a reflected image which is caused by an external environment. However, there is a low probability that this reflected image happens to occur in the rxs area which is set in step 309, or selection is performed in step 311 even if it occurs in the rxs area.

Subsequently, it is judged whether (x1,y1) and (x2,y2) constitute a pair for the cornea reflected image (step 311). In this step, if the difference between the coordinate values on y-axis is smaller than a predetermined value Th2 (Th2>0), these coordinates are judged to be "parallel". If no pair for the cornea reflected image is found out, the process returns to step 407 to perform the comparison operation again using the second largest area as a candidate of the retina reflected image. The step 311 constitutes the reflected image check means.

Thereafter, in the sighting direction calculation unit 108, the sighting direction of the vehicle driver 101 is calculated on the basis of the coordinate of the gravity center of the two cornea reflected image and the coordinate of the gravity center of the pupil area (step 310).

Figure 8:
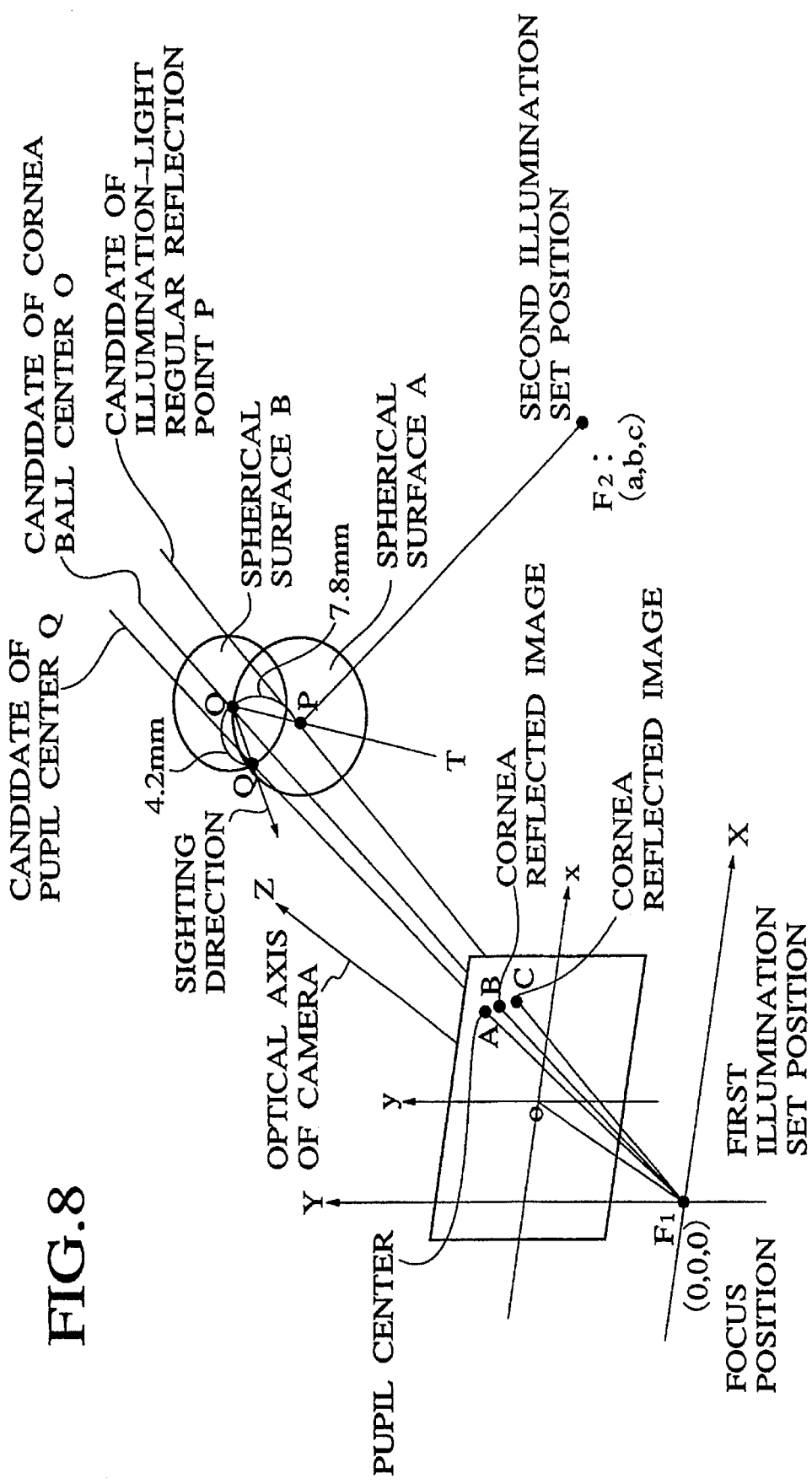
FIG. 8 is a diagram showing a specific example of the sighting direction measuring process.
Figure 9:
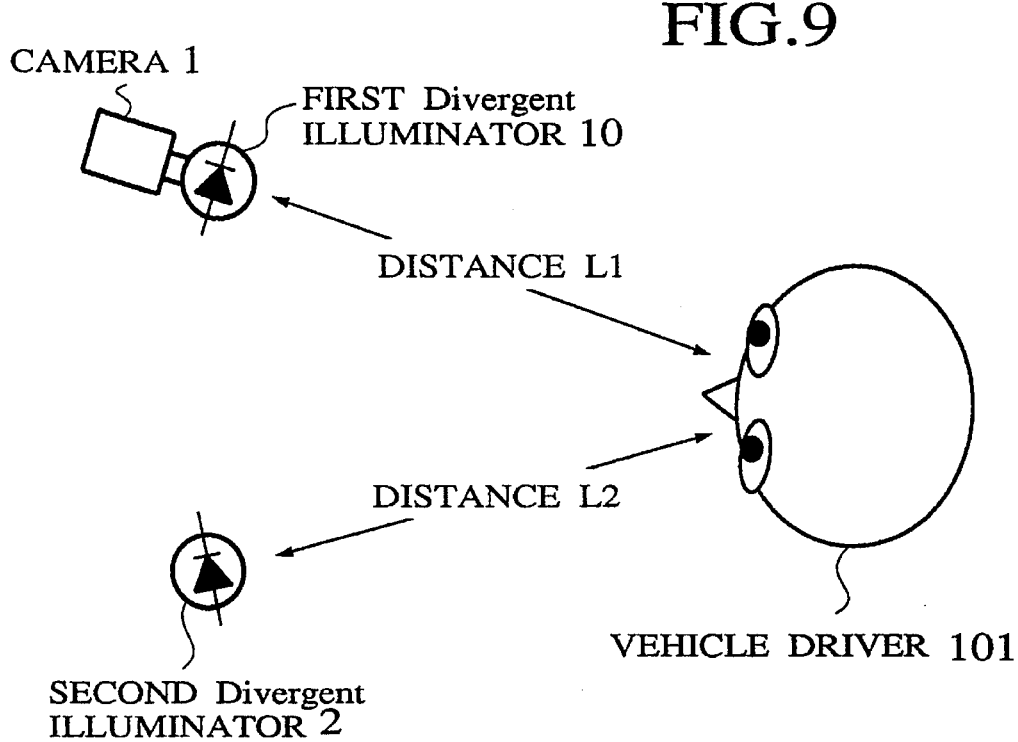
FIG. 9 is a diagram showing an arrangement of divergent illuminators and a driver.

Next, the calculation of the sighting direction in the sighting direction calculator 108 will be described with reference to FIG. 8.

If the light source and the camera are disposed so that the optical axes thereof are coincident with each other, it would be considered that the illumination position, the cornea reflected image and the cornea ball center are straightly aligned with one another, or a line connecting the focus point of the camera and the cornea reflected image on the CCD surface of the camera passes through the center of the cornea ball. That is, the center O of the cornea ball is located on a line F1B. Furthermore, the center Q of the pupil is located on a line F1A.

Now, the focus distance of the camera is represented by f, and a world coordinate system F1-XYZ in which the position of the focus point is set as an origin F1(0,0,0), the x-axis (horizontal axis) direction and the y-axis (vertical axis) on the CCD surface are set as X-axis and Y-axis respectively, and the optical axis direction of the camera is set as Z-axis, is considered. Furthermore, the second illuminator 2 is assumed to be located at F1(a,b,c).

The illumination light of the second illuminator 2 is regularly reflected from the surface of the cornea and then observed by the camera 1. Accordingly, the regular reflection point P of the illumination light is on a line F1C.

Here, the radius of the human cornea ball is substantially constant (about 7.8 mm) for all human beings. Accordingly, if the regular reflected point P is temporarily located on the line F1C and a spherical surface having a radius of 7.8 mm is drawn, a candidate point O of the cornea ball center is necessarily determined as an intersection point between the spherical surface A and the line F1B. One of two intersection points which is located farther is set as the point O.

Here, if it is checked that the following regular reflection condition at the point P is satisfied, the point O is determined:

∠F1PT (T represents a point on an extension line of a half line OP)=∠F2PT.

In addition, since the distance between the center of the cornea ball and the center of the pupil (front surface of crystalline lens) is equal to about 4.2 mm, the pupil center Q is determined and thus a slighting vector OQ is determined by calculating an intersection point between the line F1A and a spherical surface B having a radius of 4.2 mm whose center is located at the determined point O. One of two intersection points which is nearer to the camera is set as the point Q. Each optical constant of the eye ball is based on a Gullstrand's eye model.

The calculation of the sighting direction as described above is repeated, and a gaze time (a driver's attention paying time) in the sighting direction is judged in the gaze judgment unit 109.

If it is confirmed in step 314 that the driver's attention in the sighting direction is paid to the air-conditioner area in the sighting switch area 6 for a fixed time (for example, 0.3 second), the driver 101 is judged to gaze at an air conditioner switch, and the process goes to step 315. The steps 312 to 314 constitute the sighting direction detecting (measuring) means.

Subsequently, the air conditioner controller 112 is selected by the controller switching unit 110 to display a current set temperature of the air conditioner on the HUD display area 7. At the same time, the sighting direction detecting operation is stopped (step 315).

When the air conditioner display is made on the HUD display area, an up/down button of the steering switch 4 functions to increase or decrease the set temperature of the air conditioner.

The driver 101 operates the up/down button of the steering switch 4 to set the temperature to a desired value while watching the HUD display, and the air conditioner controller 112 performs a prescribed temperature control on the basis of the set information (temperature). If the steering switch 4 is not operated for a fixed time (for example, 5 seconds), the controller switching unit 110 judges that the operation is finished, and it finishes a series of processing. Furthermore, if it is judged in step 314 that no attention is paid, the process goes to step 302 to repeat the sighting direction detection. The step 315 constitutes the information transfer means.

In the embodiment as described above, if the light amount of the second illuminator when the second image is obtained is set so that the density value of the background containing elements (for example, cheek, forehead, etc.) other than the eye-ball portion is set to be equal between the first and second images, undesired information other than information on the retina reflected image and the cornea reflected image is removed in the difference process, so that the discrimination process of the reflected image can be more facilitated. Actually, it is impossible that the density of the background is set to be perfectly equal between the first and second images because of the difference in light emission position of the light sources. However, if the distance L1 between the first divergent illuminator 10 and the driver is equal to the distance L2 between the second divergent illuminator 2 and the driver, it is a best way that the total light amount of the first illuminator 10 and the second illuminator 2 when the first image is obtained is set to be equal to the light amount of the second illuminator 2 when the second image is obtained. If this way is adopted, the area to be detected in the labelling processing in step 403 is reduced, so that the processing can be performed at a high speed. That is, if the first and second illuminators emit respective light so that the light amount is equal therebetween when the first image is picked up, the light amount of the second illuminator when the second image is picked up is set to two times of that when the first image is picked up.

Next, a second embodiment according to the present invention will be described.

Figure 10:
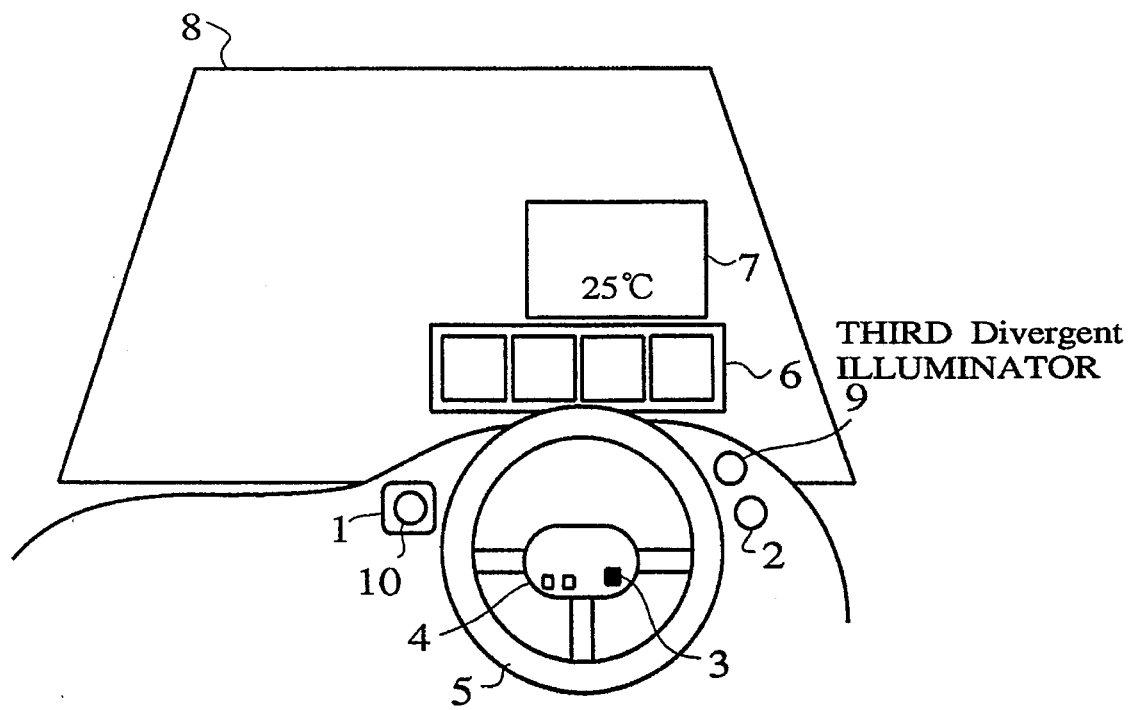
Figure 11:
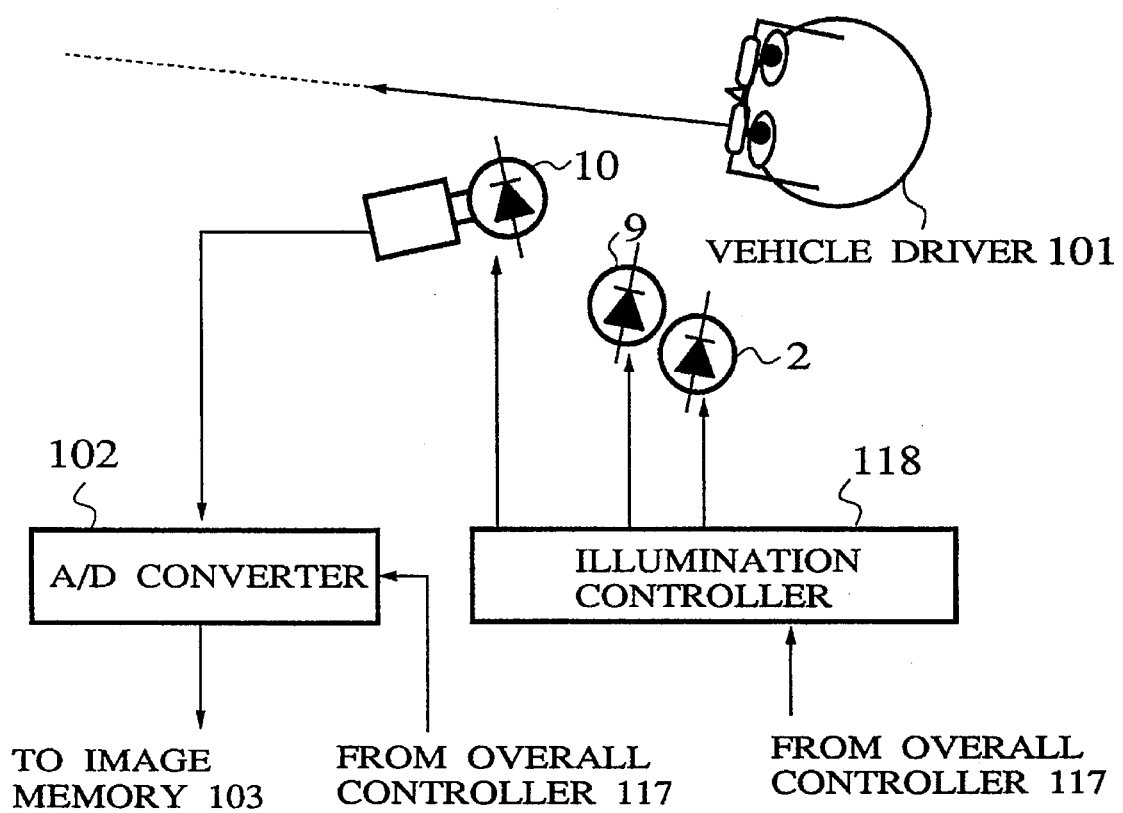
FIG. 11 is a diagram showing only a main portion of an illumination arrangement of a second embodiment.

The second embodiment is characterized in that a divergent illuminator is further provided to the sighting direction detecting device of the first embodiment. That is, as shown in FIGS. 10 and 11, a third divergent illuminator 9 comprising the same type of near infrared-ray source as the first divergent illuminator 1 which is disposed so that the illumination direction thereof is coincident with the optical axis of the CCD camera 1 is disposed at a different place from the first divergent illuminator 10 separately from the second divergent illuminator 2. The second embodiment is substantially identical to the first embodiment except that the third divergent illuminator 9 is provided.

Figure 12:
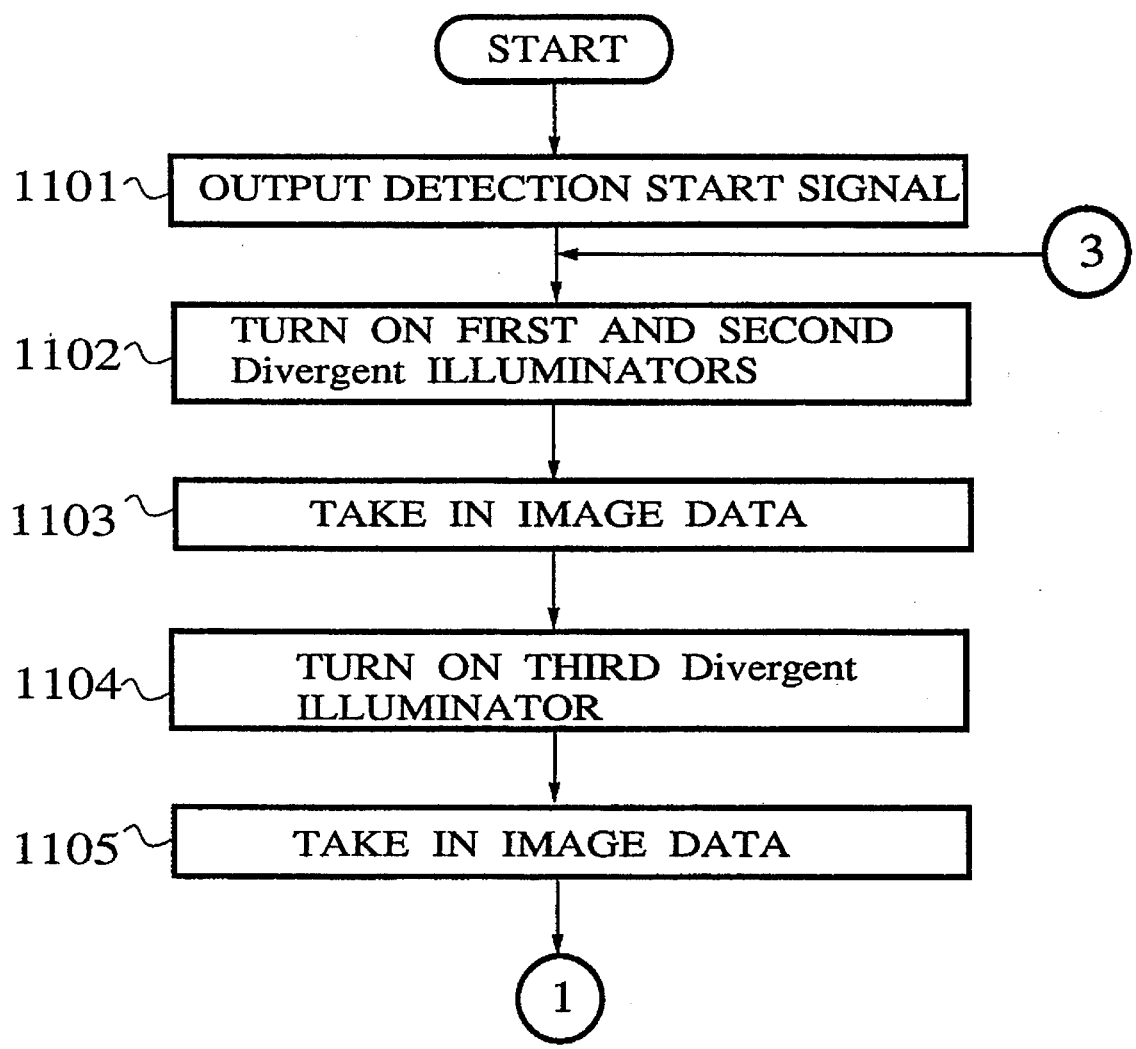
FIG. 12 is a flowchart showing only a main portion of the sighting direction measuring process in the second embodiment.

Next, the operation of the second embodiment will be described with reference to the flowchart of FIG. 12.

First, upon output of a detection (measurement) start signal from the overall controller 117(step 1101), a trigger signal is output from the illumination controller 118 in response to the detection start signal to turn on both the first and second divergent illuminators 10 and 2, whereby the face of the driver 101 is illuminated (step 1102).

Subsequently, an image of the illuminated face area is taken into (picked up by) the camera 1, and the image information is subjected to A/D conversion in the A/D converter 102 to obtain digital image data I1(x,y). The digital image data I1(x,y) thus obtained are stored in the image memory 103 (step 1103).

Subsequently, in response to the trigger signal from the illumination controller 118, the third divergent illuminator 9 is turned on to illuminate the face of the driver 101 (step 1104), and then an image of the illuminated face area is taken into the camera 1. The image information is subjected to the A/D conversion to obtain digital image data I2(x,y) in the same manner as described above, and then stored in the image memory 103. The subsequent procedure is identical to that of the first embodiment, and the process goes to the step 306 of FIG. 4.

The third illuminator 9 is not limited to a single light source. That is, the third illuminator 9 may comprise two illuminators which are the same types as the first and second illuminators 10 and 2 respectively used when the first image is obtained. This situation is effective particularly in a case where the first and second illuminators 10 and 2 are driven to illuminate at the respective rating upper limit.

Next, a third embodiment according to the present invention will be described. In this embodiment, the equipment arrangement in the vehicle is identical to that of the second embodiment shown in FIG. 11.

Figure 13:
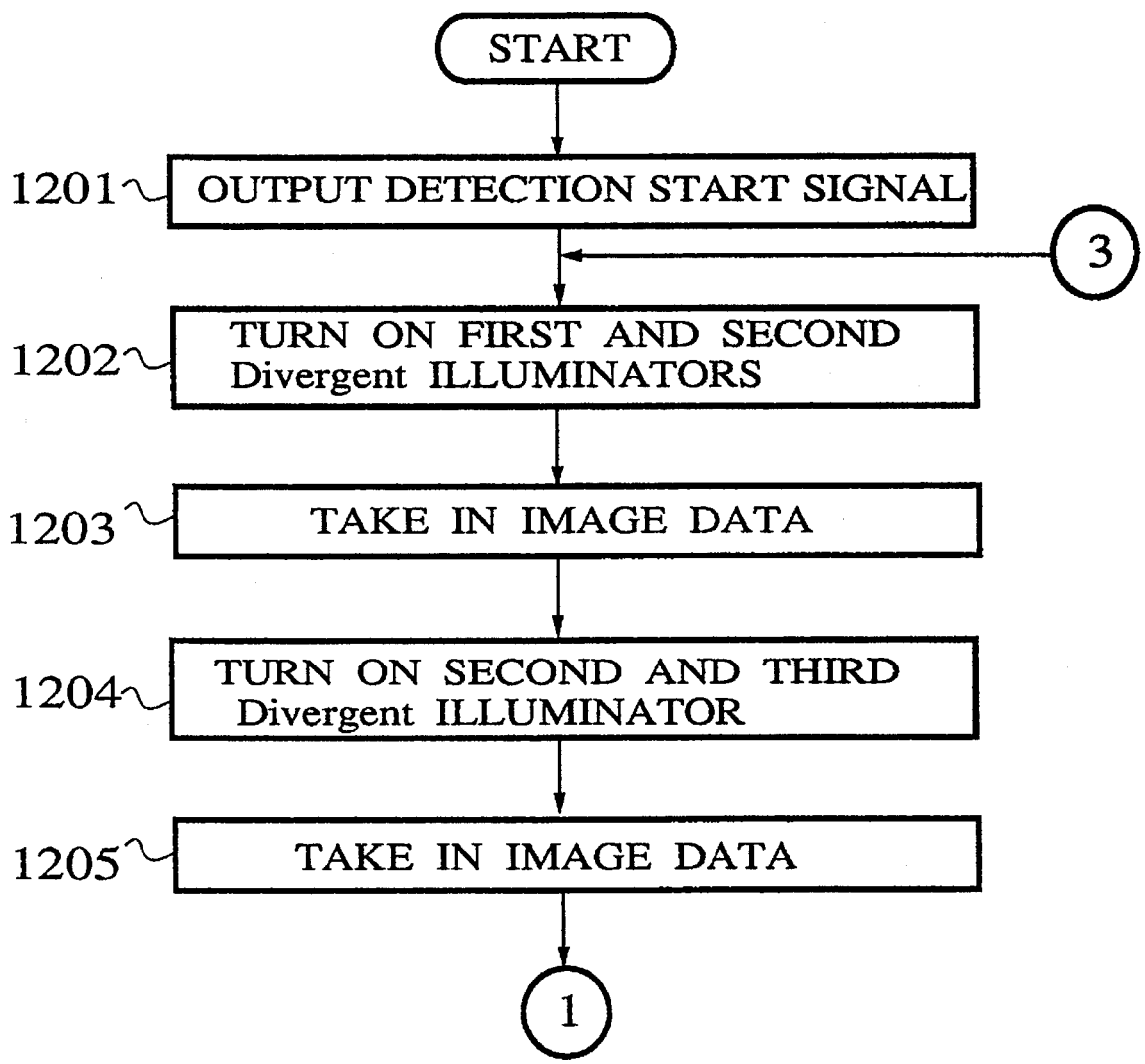
FIG. 13 is a flowchart showing a main portion of the sighting direction measuring process in a third embodiment.

The operation of the third embodiment will be described with reference to the flowchart of FIG. 13.

First, upon output of the detection (measurement) start signal from the overall controller 117 (step 1201), the trigger signal is output from the illumination controller 118 in response to the detection start signal to turn on both the first divergent illuminator 10 and the second divergent illuminator, whereby the face of the driver 101 is illuminated (step 1201).

Subsequently, the image of the illuminated face area is taken into the camera 1, and then subjected to the A/D conversion in the A/D converter 102 to obtain digital image data I1(x,y). The digital image data I1(x,y) thus obtained are stored in the image memory 103 (step 1203).

Thereafter, in response to the trigger signal from the illumination controller 118, both the second divergent illuminator 2 and the third divergent illuminator 9 are turned on to illuminate the face of the driver 101 (step 1205). Then, the image of the illuminated face area is taken into the camera 1. In the same manner as described above, the image information is converted to the digital image data I2(x,y) in the A/D converter 102, and then the digital image data I2(x,y) are stored in the image memory 103 (step 1205). The subsequent procedure is identical to that of the first embodiment, and the process goes to the step 306 of FIG. 4.

This embodiment has an advantage that the background can be easily removed in the difference processing irrespective of the light source of the second illuminator 2 by substantially equalizing the light source of the first illuminator 10 and the light amount of the third illuminator 9.

Next, a fourth embodiment according to the present invention will be described. The equipment arrangement in the vehicle of this embodiment is identical to that of the second embodiment shown in FIG. 11.

Figure 14:
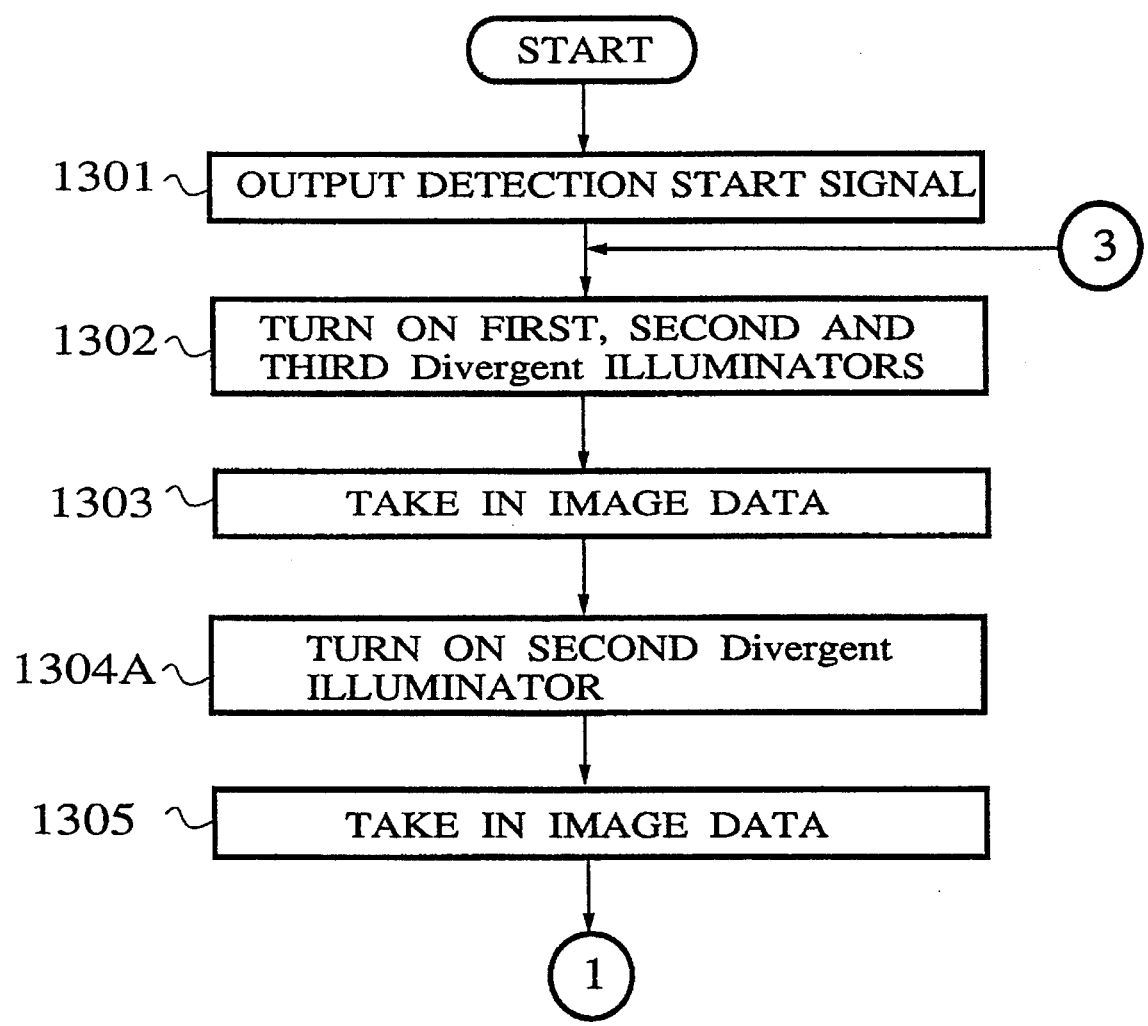
FIG. 14 is a flowchart showing an example of a main portion of the sighting direction measuring process in a fourth embodiment.
Figure 15:
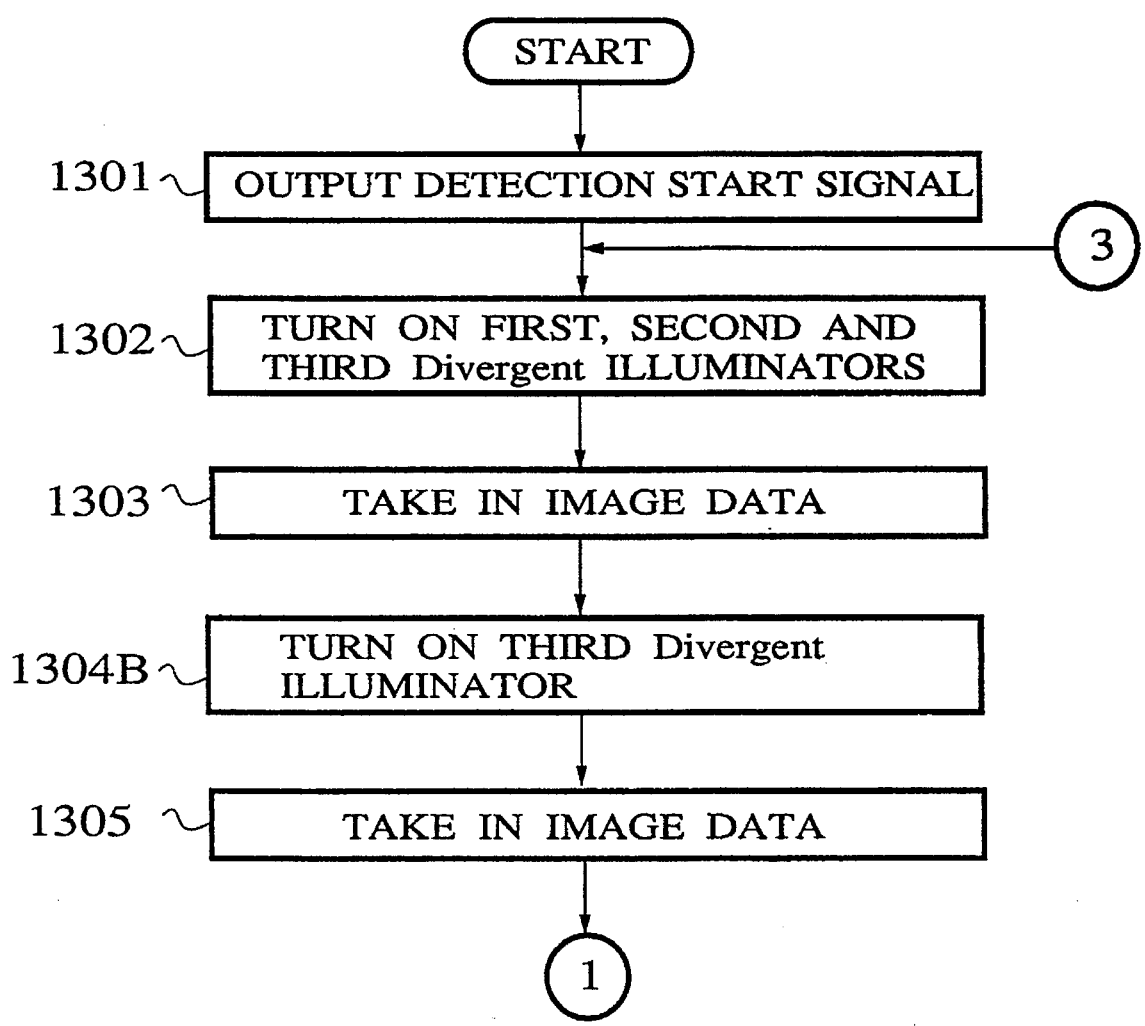
FIG. 15 is a flowchart showing another example of the main portion of the sighting direction measuring process in the fourth embodiment.
Figure 16:
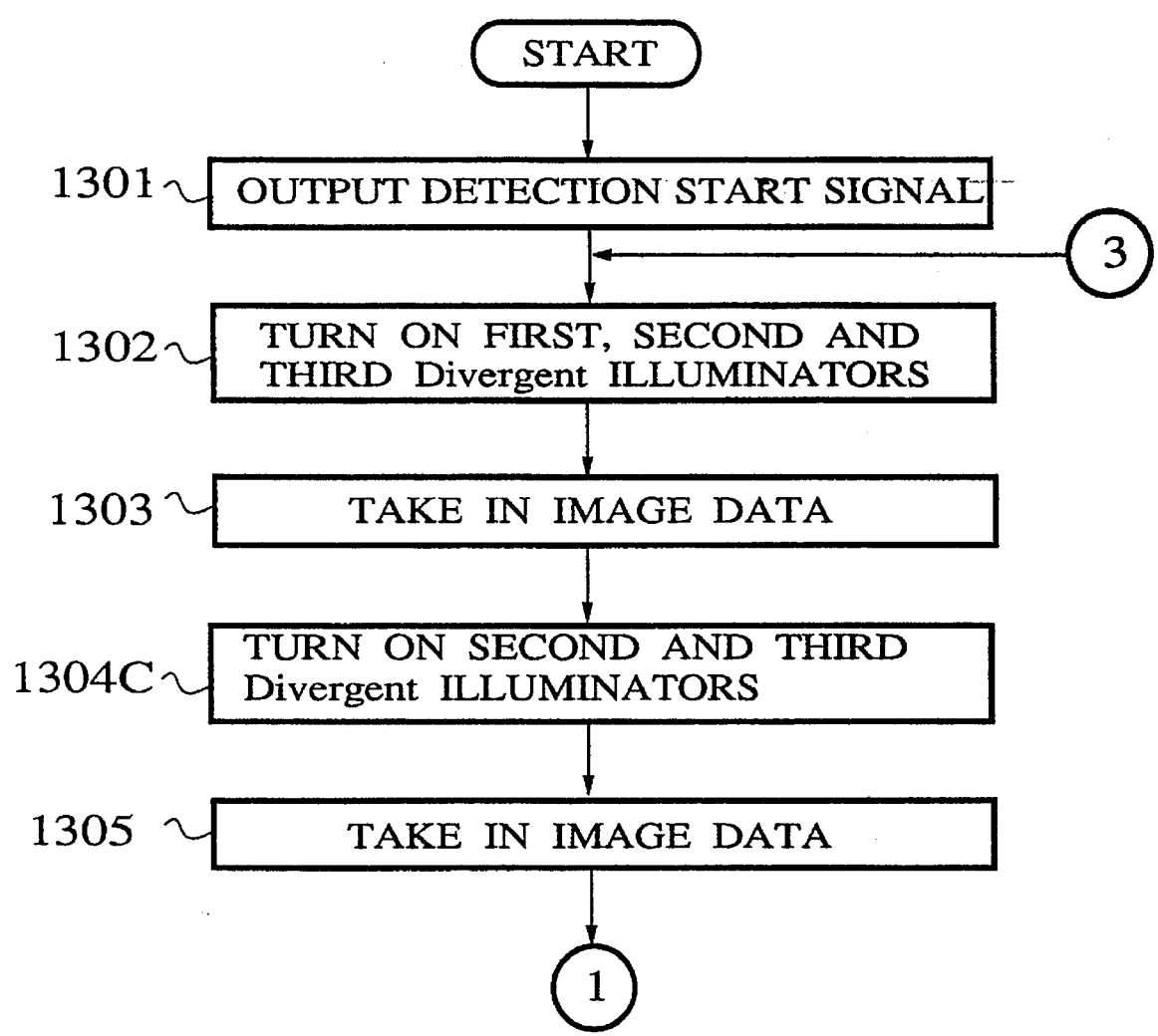
FIG. 16 is a flowchart showing another example of the main portion of the sighting direction measuring process in the fourth embodiment.

The operation of the fourth embodiment will be described with the flowcharts of FIGS. 14, 15 and 16.

First, upon output of the detection (measurement) start signal from the overall controller 117 (step 1301), the trigger signal is output from the illumination controller 118 on the basis of the trigger signal to turn on all the first, second and third divergent illuminators 10, 2 and 9, whereby the face of the driver 101 is illuminated by the first to third divergent illuminators (step 1302).

Thereafter, the image of the illuminated face area is taken into the camera 1, and the image information is A/D-converted to digital image data I1(x,y) in the A/D converter 102. The digital image data I1(x,y) are stored in the image memory (step 1303).

Subsequently, in response to the trigger signal from the illumination controller 118, any one of the second divergent illuminator (shown in step 1304A of FIG. 14) and the third divergent illuminator 9 (shown in step 1304B of FIG. 15), or both the second divergent illuminator 2 and the third divergent illuminator 9 (shown in step 1304C of FIG. 16) are turned on to illuminate the face of the driver 101.

Subsequently, the image of the illuminated face area is taken into the camera 1. In the same manner as described above, the image information is A/D-converted to digital image data I2(x,y) in the A/D converter 102, and the digital image data I2(x,y) are stored in the image memory 103 (step 1305). The subsequent procedure is identical to that of the first embodiment, and the process goes to the step 306 of FIG. 4.

According to the fourth embodiment, there is an effect that a pattern matching can be performed in addition to the effects of the first, second and third embodiments. That is, in the first embodiment, the processing in step 307 is performed on the assumption that the reflected images occur in parallel. However, the arrangement of the light sources show in FIG. 17 produces respective reflected images shown in FIG. 17.

Figure 17:
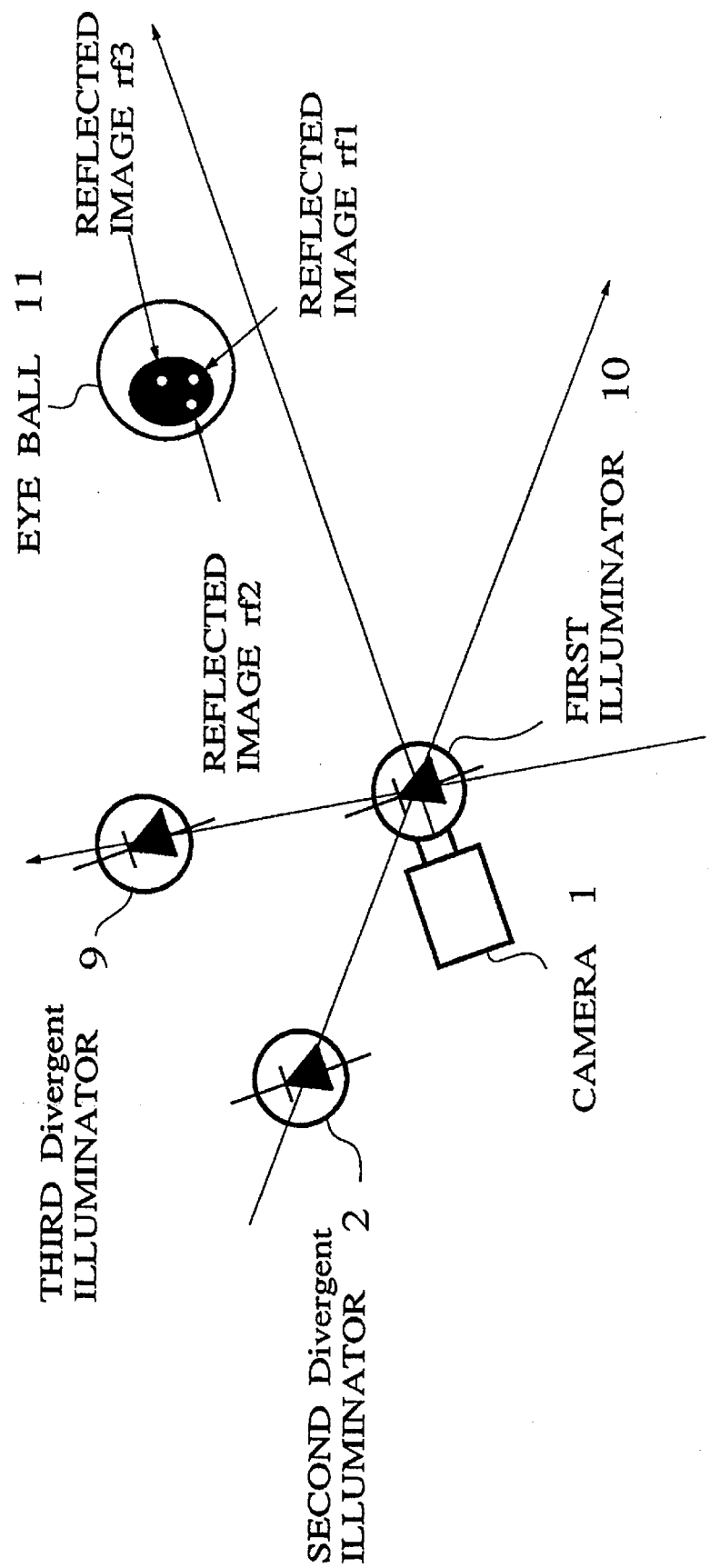
FIG. 17 is a diagram showing an illumination arrangement and a corresponding reflection pattern in the fourth embodiment.

In the case of FIG. 17, the pattern matching may be performed by searching, on an image, a shape which connects a reflected image rf1 based on the first illuminator 10, a reflected image rf2 based on the second illuminator 2 and a reflected image rf3 based on the third illuminator 9.

If the pattern matching is performed, there is obtained an effect that the cornea reflected extraction processing having high resistance against noises, and for example, this effect can improve the processing precision by the reflected image check means in step 307.

As described above, according to the present invention, the switch operation can be performed without turning driver's eyes from the front side, so that safety at a driving time can be improved. Furthermore, the number of switches on an instrument panel and around a center console can be reduced, so that the degree of freedom in design can be heightened. In addition, a conventional TV camera can be used to perform the sighting direction detecting operation under a circumstance that the vehicle is vibrated, so that the price of the device can be reduced.

As described above, according to the present invention, the first image is picked up by turning on the illuminating means containing the first illumination means and the second illumination means while the second image is picked up by turning on the illuminating means which does not contain the first illumination means, and the sighting direction is detected by calculating the retina reflected image position, the cornea reflected image position under illumination of the first illumination means and the cornea reflected image position under illumination of the second illumination means. Therefore, the first image contains all the retina reflected image position, the cornea reflected image position under illumination of the first illumination means and the cornea reflected image position under illumination of the second illumination means, so that there occurs no positional deviation due to a time image for the image take-in operation of two images. Accordingly, the sighting direction can be accurately and easily detected using the difference processing under a vibrational condition.

What is claimed is:

1. A sighting direction detecting device comprising:

a TV camera which is disposed to face a human being and picks up an image of light invisible to human;

first illuminating means which is disposed in a coaxial system with said TV camera and illuminates a human's eye-ball portion with light which is invisible to human beings;

second illuminating means which is disposed at a different place from said first illuminating means and illuminates the human's eye-ball portion with light which is invisible to human beings;

first calculating means for calculating an equation of a line passing the pupil center position of the eye-ball, an equation of a line passing the reflected-light position of said first illuminating means and an equation of a line passing the reflected-light position of said second illuminating means on the basis of the image which is picked up by said camera;

second calculating means for calculating the center position of a cornea ball on the basis of the equation of the line passing the reflected-light position of said first illuminating means and the equation of the line passing the reflected-light position of said second illuminating means which are calculated by said first calculating means; and third calculating means for calculating the sighting direction of the human being on the basis of the equation of the line passing the pupil center position detected by said first calculating means and the center position of the cornea ball which is calculated by said second calculating means, wherein the image obtained by said TV camera comprises a first image obtained under illumination of said first illuminating means and said second illuminating means and a second image obtained under illumination of illuminating means which does not contain said first illuminating means.

2. The sighting direction detecting device as claimed in claim 1, further comprising at least one third illuminating means which is disposed at a different place from said first illuminating means and illuminates the human's eye-ball with light which is invisible to human beings, wherein the image obtained by said TV camera comprises a first image obtained under illumination of both said first illuminating means and said second illuminating means, and a second image obtained under illumination of at least said third illuminating means of said second illuminating means and said third illuminating means and under non-illumination of said first illuminating means.

3. The sighting direction detecting device as claimed in claim 1, further comprising at least one third illuminating means which is disposed at a different place from said first illuminating means and illuminates the human's eye-ball portion with light which is invisible to human beings, wherein the image obtained by said TV camera comprises a first image obtained under illumination of said first illuminating means, said second illuminating means and said third illuminating means, and a second image obtained under illumination of at least said third illuminating means of said second illuminating means and said third illuminating means and under non-illumination of said first illuminating means.

4. A sighting switch for selectively switching on one of various equipments in accordance with a sighting direction of an user, comprising:

a camera for imaging the face of the user;

a first illuminator which is disposed coaxially with said camera and illuminates a human's eye-ball portion with light invisible to human beings;

a second illuminator which is disposed at a different place from said first illuminator and illuminates the human's eye-ball portion with light invisible to human beings;

a sighting direction calculator for calculating the position of a retina reflected image and the position of a cornea reflected image on the basis of image data which are obtained with said camera under selective illumination of said first illuminator and said second illuminator, and calculating a sighting direction of the user on the basis of the position of the retina reflected image and the position of the cornea reflected image;

an user's gaze judgment unit for judging the position at which the user gazes for a predetermined time, and outputting control information; and a controller for receiving the control information from said user's gaze judgment unit and selectively switching on one of the equipments on the basis of the control information, wherein the image data obtained by said camera include first image data obtained when said first and second illuminators are turned on, and second image data obtained when said second illuminator is turned on.

5. The sighting switch as claimed in claim 4, further comprising a third illuminator which is disposed at a different place from said first illuminator and illuminates the human's eye-ball with light invisible to human beings, wherein the image data obtained by said camera includes first image data obtained when both said first and second illuminators are turned on, and second image data obtained when said third illuminator is turned on.

6. The sighting switch as claimed in claim 4, further comprising at least a third illuminator which is disposed at a different place from said first illuminator and illuminates the human's eye-ball portion with light invisible to human beings, wherein the image data obtained by said camera includes first image data obtained when said first, second and third illuminators are turned on, and second image obtained when said third illuminator is turned on.

* * * * *